US011503014B2

(12) United States Patent
Murakata

(10) Patent No.: US 11,503,014 B2
(45) Date of Patent: Nov. 15, 2022

(54) INFORMATION APPARATUS, METHOD OF PROCESSING COMMUNICATION REQUEST, AND NON-TRANSITORY RECORDING MEDIUM

(71) Applicant: Akira Murakata, Tokyo (JP)

(72) Inventor: Akira Murakata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/356,799

(22) Filed: Jun. 24, 2021

(65) Prior Publication Data

US 2022/0029984 A1 Jan. 27, 2022

(30) Foreign Application Priority Data

Jul. 22, 2020 (JP) .............................. JP2020-124883

(51) Int. Cl.
*H04L 9/40* (2022.01)
*H04L 67/02* (2022.01)

(52) U.S. Cl.
CPC ........ *H04L 63/0823* (2013.01); *H04L 63/166* (2013.01); *H04L 63/18* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 11,042,650 B2* | 6/2021 | Fu | .................. | G06F 21/6218 |
| 11,372,993 B2* | 6/2022 | Roth | .................. | G06F 21/6218 |
| 2008/0082677 A1* | 4/2008 | Miyazawa | .......... | H04L 63/0428 709/229 |
| 2012/0233702 A1 | 9/2012 | Matsuda et al. | | |
| 2018/0295190 A1* | 10/2018 | Lu | .......................... | H04L 67/146 |
| 2019/0245767 A1* | 8/2019 | Di Girolamo | ........ | H04L 69/164 |
| 2020/0267201 A1* | 8/2020 | Rauschenbach | ........ | G06F 9/542 |
| 2020/0344084 A1* | 10/2020 | Shribman | ............... | H04L 69/16 |
| 2020/0358858 A1* | 11/2020 | Shribman | ........... | H04L 63/1466 |

(Continued)

FOREIGN PATENT DOCUMENTS

| | | |
|---|---|---|
| EP | 3068102 | 9/2016 |
| JP | 2009-064144 | 3/2009 |
| JP | 2012-238150 | 12/2012 |

OTHER PUBLICATIONS

Extended European Search Report for 21181159.1 dated Dec. 7, 2021.

(Continued)

*Primary Examiner* — Quang N Nguyen

(74) *Attorney, Agent, or Firm* — IPUSA PLLC

(57) ABSTRACT

An information apparatus includes circuitry to receive a communication request transmitted from a request source device. The communication request is one of a plaintext communication request and a ciphertext communication request. In response to receiving the plaintext communication request, the circuitry transfers the plaintext communication request for processing. In response to receiving the ciphertext communication request, the circuitry decrypts the ciphertext communication request to obtain another communication request and transfers the another communication request for processing.

12 Claims, 9 Drawing Sheets

(56) References Cited

U.S. PATENT DOCUMENTS

2022/0029822 A1* 1/2022 Ubbens ................ H04L 9/3247
2022/0103525 A1* 3/2022 Shribman ........... H04L 63/0272

OTHER PUBLICATIONS

Fette Google I et al: "The WebSocket Protocol; rfc6455.txt", The Websocket Protocol; RFC6455.txt, Internet Engineering Task Force, IETF; Standard, Internet Society (ISOC) 4, Rue Des Falaises CH-1205 Geneva, Switzerland, Dec. 11, 2011 (Dec. 11, 2011), pp. 1-71, XP015081377, [retrieved on Dec. 11, 2011] * Sections 1-4 *.

* cited by examiner

INFORMATION APPARATUS, METHOD OF PROCESSING COMMUNICATION REQUEST, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2020-124883, filed on Jul. 22, 2020, in the Japan Patent Office, the entire disclosure of which is hereby incorporated by reference.

BACKGROUND

Technical Field

Embodiments of the present disclosure relate to an information apparatus, a method of processing a communication request, and a non-transitory recording medium.

Related Art

A remote access technology for remotely operating an information apparatus or the like from a remote location has been known.

There is a known technology related to remote access for enhancing convenience and cost efficiency in remote connection. In the conventional technology, a device stores access destination information for accessing a Local Area Network (LAN) and a connection program for the remote connection. When a computer connects with the device, the computer starts executing the connection program stored in the device, acquires the access destination information from the device according to the connection program, builds an environment for a Virtual Private Network (VPN) connection based on the access destination information, and establishes a remote connection to a local area network.

SUMMARY

An exemplary embodiment of the present disclosure includes an information apparatus including circuitry to receive a communication request transmitted from a request source device. The communication request is one of a plaintext communication request and a ciphertext communication request. In response to receiving the plaintext communication request, the circuitry transfers the plaintext communication request for processing. In response to receiving the ciphertext communication request, the circuitry decrypts the ciphertext communication request to obtain another communication request and transfers the another communication request for processing.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
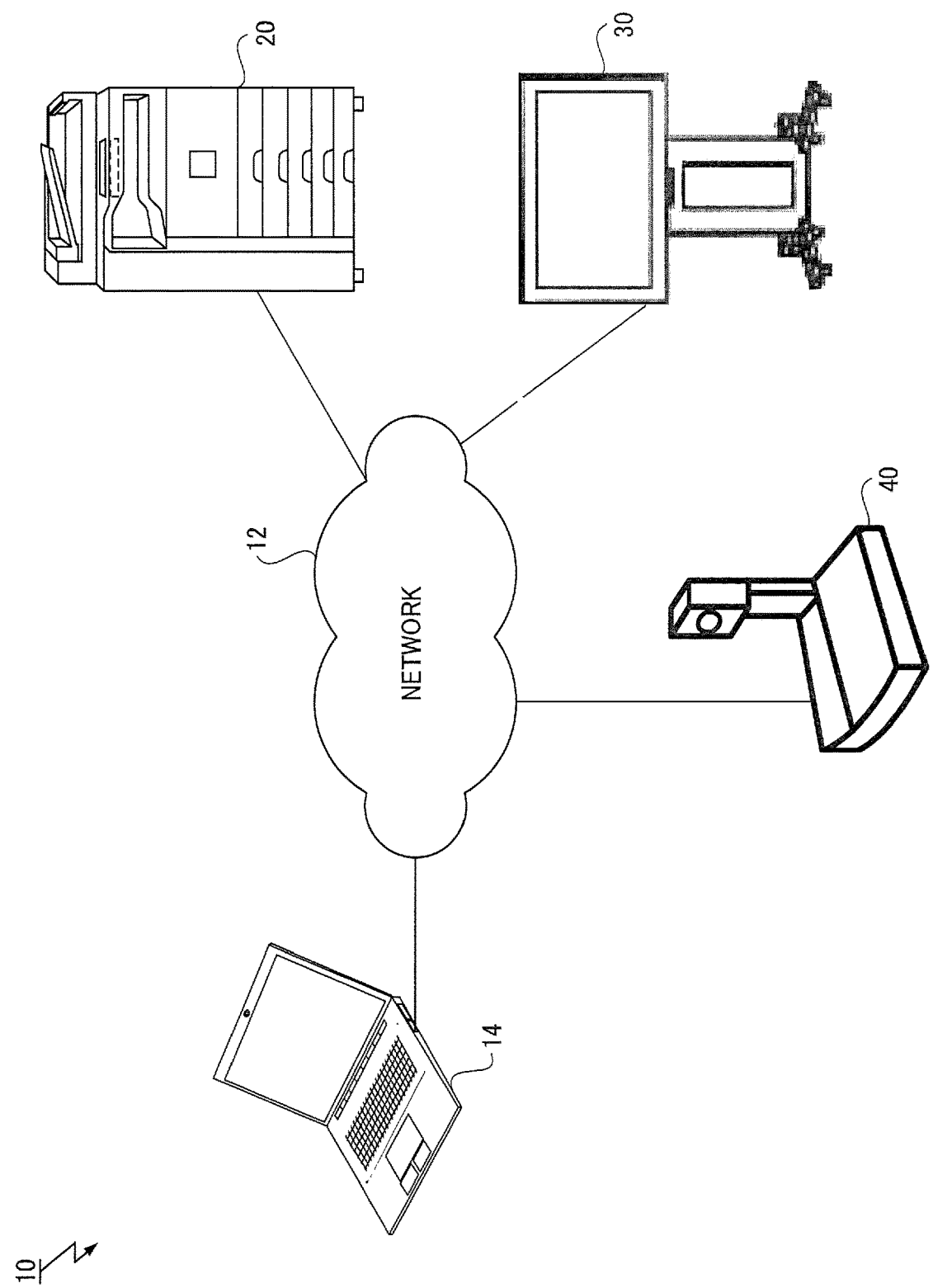
FIG. 1 is a schematic diagram illustrating a network environment including information apparatuses and a user terminal device according to one or more embodiments.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an embodiment of the present disclosure is described, but the embodiments of the present disclosure are not limited to the following embodiment. In the embodiment described below, as examples of information apparatuses, a multifunction peripheral (MFP) 20, an electronic whiteboard 30, and a video conference terminal 40 are used. However, the information apparatuses are not limited to the specific ones used in the embodiment described below.

FIG. 1 is a schematic diagram illustrating a network environment 10 including information apparatuses and a user terminal device for remotely accessing the information apparatuses according to the present embodiment. The network environment 10 illustrated in FIG. 1 includes a user terminal device 14 connected to a network 12, a multifunction peripheral 20 as an information apparatus, which is also connected to the network 12 and remotely accessible, the electronic whiteboard or an Interactive White Board (IWB) (which is a white board having an electronic whiteboard function capable of performing intercommunication) 30, and the video conference terminal 40.

The network 12 may include a wired network, a wireless network, a Local Area Network (LAN), which includes the wired and wireless networks, and a public communications network, such as the Internet or a mobile communications network, in general.

The user terminal device 14 is a request source device for remotely accessing an information apparatus (the multifunction peripheral 20, the electronic whiteboard 30, or the video conference terminal 40). The user terminal device 14 is installed with a web browser or a dedicated application. The user terminal device 14 uses the web browser or the dedicated application to remotely access the information apparatus (the multifunction peripheral 20, the electronic whiteboard 30, or the video conference terminal 40) and operate the information apparatus.

The information apparatuses (the multifunction peripheral 20, the electronic whiteboard 30, and the video conference terminal 40) provide various services to users. In FIG. 1, as examples, a multifunction peripheral 20, an electronic whiteboard 30, and a video conference terminal 40 are illustrated. The multifunction peripheral 20 is an image forming apparatus that provides various image processing such as printing, scanning, copying, and facsimile communication processing, as a service. The electronic whiteboard 30 provides an electronic whiteboard function as a service. The video conference terminal 40 is an electronic conference system that provides a service for making a video call with another video conference terminal located at a remote location (site). As examples of a remotely accessible information apparatus, an electronic whiteboard, an image forming apparatus, and an electronic conference system are used. The information apparatus is not particularly limited to the above-mentioned examples, as long as the device has a communication function and a function of providing a predetermined service. The information apparatus may be, for example, an output device such as an image forming apparatus, which includes a copier, a scanner, or a facsimile communication device, a projector (PJ), or a digital signage. In addition, the information apparatus may be, for example, a Head Up Display (HUD) device, an industrial machine, an imaging device, a sound collecting device, a medical device, a network home appliance, a car (connected car), a digital camera, or a wearable device such as a smartwatch.

In FIG. 1, a laptop computer is illustrated as an example of the user terminal device 14. However, the user terminal device 14 is not particularly limited to that as long as a device has a communication function and a user interface as required. In some embodiments, as the user terminal device 14, another information terminal such as a desktop computer, a tablet computer, a smartphone, a cellular phone, a tablet terminal, a game machine, or a Personal Digital Assistant (PDA), may be used, for example.

In the following, a hardware configuration of the user terminal device 14 as a request source device provided in the network environment 10 and hardware configurations of the multifunction peripheral 20, the electronic whiteboard 30, and the video conference terminal 40 as information apparatuses provided in the network environment 10 are described. After that, a remote access function provided by the information apparatus according to the present embodiment is described.

Figure 2:
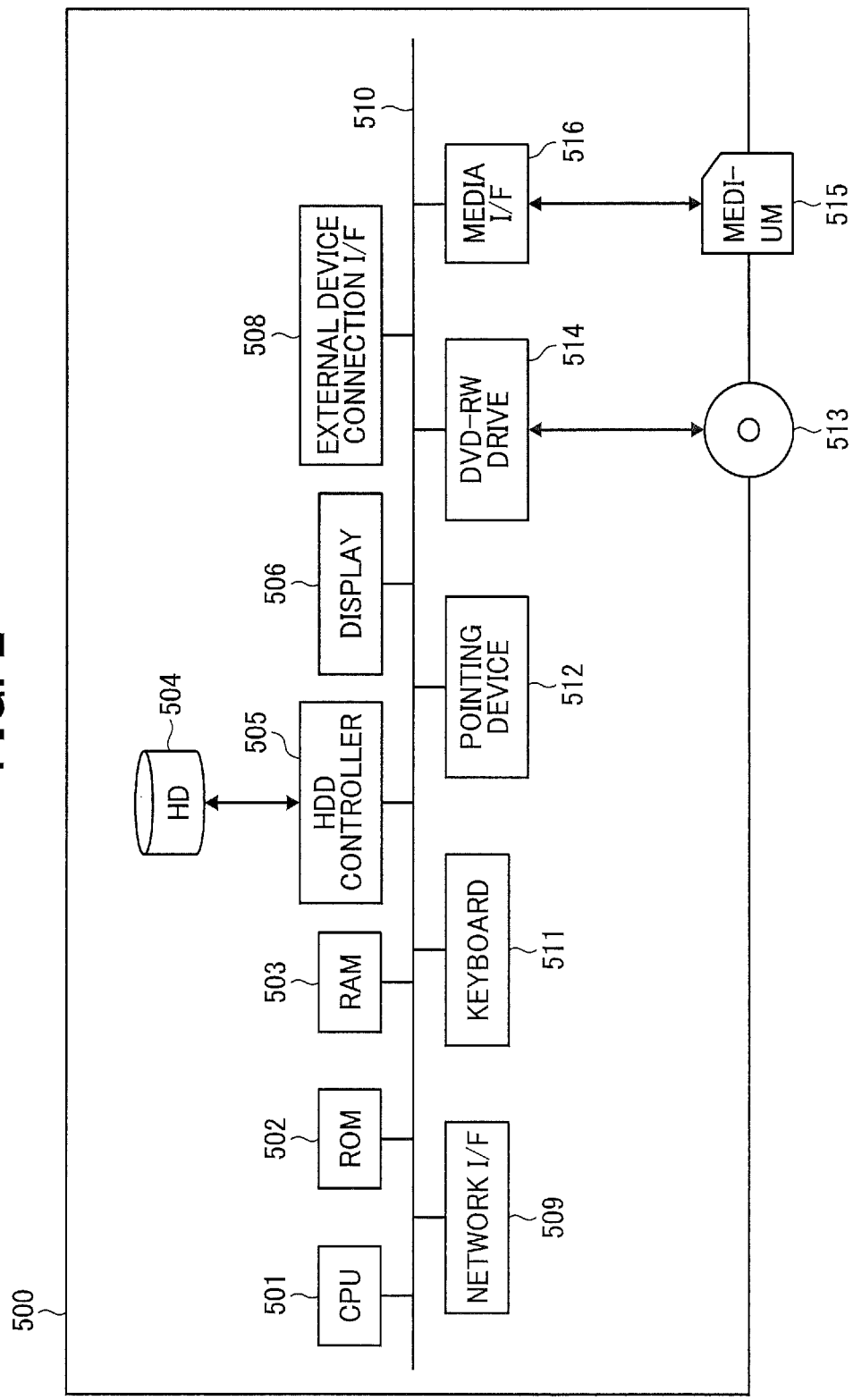
FIG. 2 is a block diagram illustrating a hardware configuration of a computer usable as a user terminal device according to one or more embodiments.

FIG. 2 is a block diagram illustrating a hardware configuration of a computer usable as a user terminal device according to the present embodiment. In the following description, a hardware configuration of a personal computer 500 is described.

As illustrated in FIG. 2, the personal computer 500 is implemented by a general-purpose computer. Specifically, the personal computer 500 of FIG. 2 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a Digital Versatile Disk Rewritable (DVD-RW) drive 514, and media I/F 516.

The CPU 501 is a processor that performs overall control of the personal computer 500. The ROM 502 stores a program such as an Initial Program Loader (IPL) used for driving the CPU 501. The RAM 503 is used as a work area for the CPU 501. The HD 504 stores various data such as a program. The HDD controller 505 controls reading or writing of various data to or from the HD 504 under control of the CPU 501. The display 506 displays various information such as a cursor, a menu, a window, a character, or an image. The external device connection I/F 508 is an interface for connecting various external devices. Examples of the external devices include, but not limited to, a universal serial bus (USB) memory and a printer. The network I/F 509 is an interface for performing data communication using a communication network. The bus line 510 is, for example, an address bus or a data bus, which electrically connects the components illustrated in FIG. 2, such as the CPU 501.

The keyboard 511 is an example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 controls reading or writing of various data from or to a DVD-RW medium 513 as one example of a removable recording medium (removable storage medium). The removable recording medium (removable storage medium) is not limited to the DVD-RW and may be a digital versatile disk-recordable (DVD-R) or the like. The media I/F 516 controls reading or writing (storing) of data from or to a recording medium 515 such as a flash memory.

Figure 3:
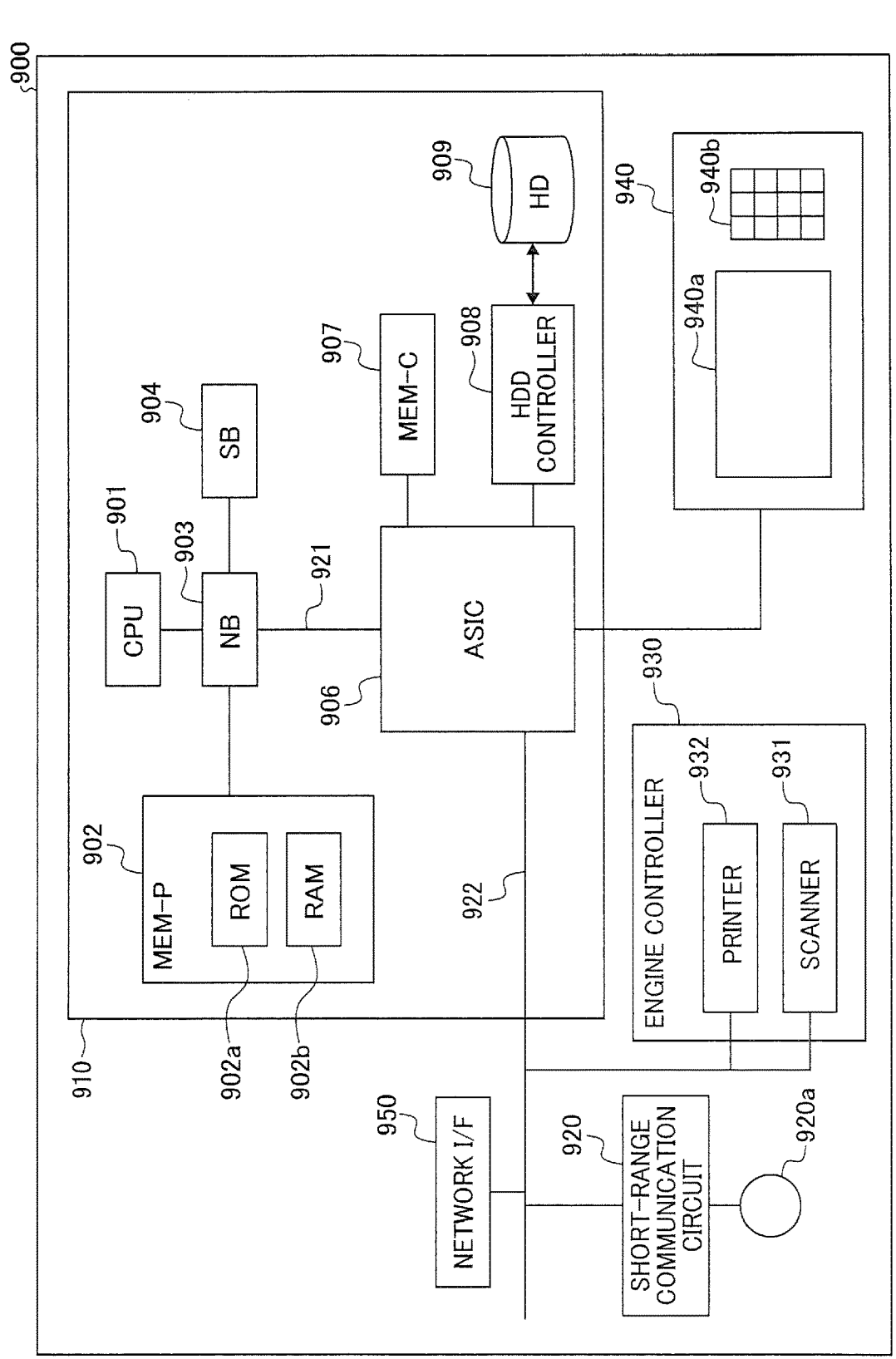
FIG. 3 is a block diagram illustrating a hardware configuration of a multifunction peripheral usable as an information apparatus according to one or more embodiments.

FIG. 3 is a block diagram illustrating a hardware configuration of a multifunction peripheral usable as an information apparatus according to the present embodiment. As illustrated in FIG. 3, a multifunction peripheral 900, or a Multifunction Peripheral/Product/Printer (MFP) 900, (corresponding to the multifunction peripheral 20 in FIG. 1) includes a controller 910, a short-range communication circuit 920, an engine controller 930, a control panel 940, and a network I/F 950.

The controller 910 includes a CPU 901 as a main processor, a system memory (MEM-P) 902, a North Bridge (NB) 903, a South Bridge (SB) 904, an Application Specific Integrated Circuit (ASIC) 906, a local memory (MEM-C) 907 as a storage, an HDD controller 908, and an HD 909 as a storage. An Accelerated Graphics Port (AGP) bus 921 connects the NB 903 and the ASIC 906.

The CPU 901 is a processor that performs overall control of the MFP 900. The NB 903 connects the CPU 901 to the MEM-P 902, the SB 904, and the AGP bus 921. The NB 903 includes a memory controller for reading or writing of various data with respect to the MEM-P 902, a Peripheral Component Interconnect (PCI) master, and an AGP target.

The MEM-P 902 includes a ROM 902a as a memory that stores a program and data for implementing various functions of the controller 910. The MEM-P 902 further includes a RAM 902b as a memory that deploys a program and data, or as a drawing memory that stores drawing data for printing. The program stored in the RAM 902b may be stored in any computer-readable storage medium, such as a compact disc-read only memory (CD-ROM), compact disc-recordable (CD-R), or digital versatile disc (DVD), in a file format installable or executable by the computer, for distribution.

The SB 904 connects the NB 903 with a Peripheral Component Interconnect (PCI) device or a peripheral device. The ASIC 906 is an Integrated Circuit (IC) having a hardware element for image formation and dedicated to an image processing use, and connects the AGP bus 921, a PCI bus 922, the HDD controller 908, and the MEM-C 907. The ASIC 906 includes a PCI target, an AGP master, an arbiter (ARB) as a central processor of the ASIC 906, a memory controller for controlling the MEM-C 907, a plurality of Direct Memory Access Controllers (DMACs) capable of converting coordinates of image data with a hardware logic, and a PCI unit that transfers data between a scanner 931 and a printer 932 through the PCI bus 922. The ASIC 906 may be connected to a USB interface, or the Institute of Electrical and Electronics Engineers 1394 (IEEE1394) interface.

The MEM-C 907 is a local memory used as a copy image buffer and a code buffer. The HD 909 stores image data, font data for printing, and form data. The HD 909 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes an antenna 920a. The short-range communication circuit 920 is a communication circuit that communicates in compliance with, for example, a Near Field Communication (NFC) or the BLUETOOTH.

The engine controller 930 includes a scanner 931 and a printer 932. The control panel 940 includes a panel display 940a and an operation device 940b. The panel display 940a is, e.g., a touch panel that displays current settings or a selection screen and that receives a user input. The operation device 940b is constructed of, e.g., a numeric keypad and a start key. The numeric keypad receives assigned values of image forming parameters such as an image density parameter. The start key receives an instruction to start copying. The controller 910 controls entire operation of the MFP 900. For example, the controller 910 controls drawing, communication, or user inputs to the control panel 940. The scanner 931 or the printer 932 includes an image processing unit such as error diffusion processing and gamma conversion processing.

In response to an instruction to select a specific application through the control panel 940, for example, using a mode switch key, the MFP 900 selectively performs a document box function, a copy function, a print function, and a facsimile function. The document box mode is selected when the document box function is selected, the copy mode is selected when the copy function is selected, the printer mode is selected when the printer function is selected, and the facsimile mode is selected when the facsimile mode is selected.

The network I/F 950 is an interface for performing data communication using the network 12. The short-range communication circuit 920 and the network I/F 950 are electrically connected to the ASIC 906 through the PCI bus 922.

Figure 4:
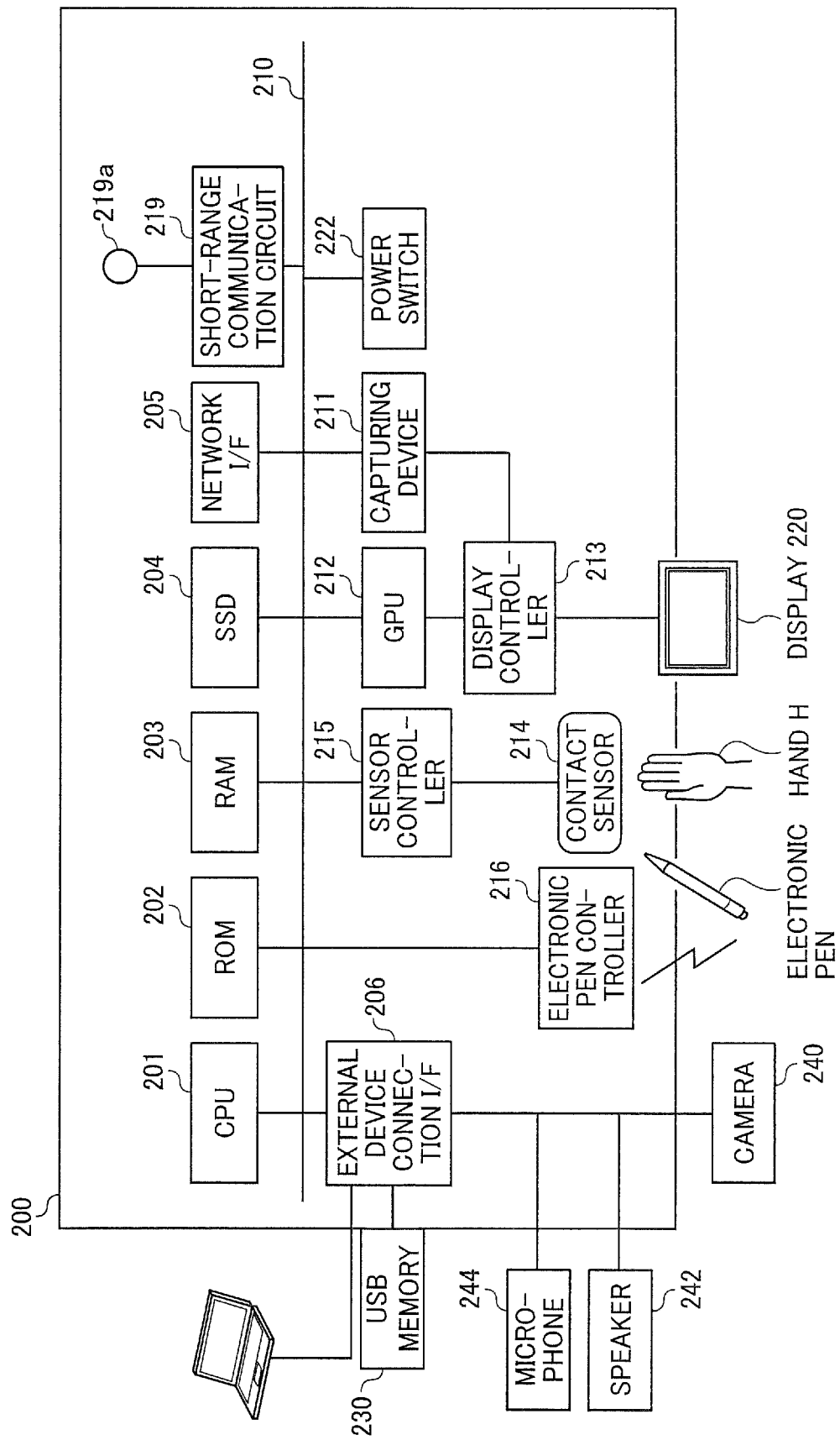
FIG. 4 is a block diagram illustrating a hardware configuration of an electronic whiteboard usable as an information apparatus according to one or more embodiments.

FIG. 4 is a block diagram illustrating a hardware configuration of the electronic whiteboard 30 usable as an information apparatus according to the present embodiment. As illustrated in FIG. 4, the electronic whiteboard 200 (corresponding to the electronic whiteboard 30 in FIG. 1) includes a CPU 201, a ROM 202, a RAM 203, a solid state drive (SSD) 204, a network interface I/F 205, and an external device connection interface I/F 206.

The CPU 201 is a processor that performs overall control of the electronic whiteboard 200. The ROM 202 stores a program such as an IPL used for driving the CPU 201. The RAM 203 is used as a work area for the CPU 201. The SSD 204 stores various data such as a program for an electronic whiteboard. The network I/F 205 controls communication with a communication network. The external device connection I/F 206 is an interface for connecting various external devices. Examples of the external device include a USB memory 230 and devices (a camera 240, a speaker 242, and a microphone 244).

The electronic whiteboard 200 further includes a capturing device 211, a graphics processing unit (GPU) 212, a display controller 213, a contact sensor 214, a sensor controller 215, an electronic pen controller 216, a short-range communication circuit 219, an antenna 219a of the short-range communication circuit 219, a power switch 222, and selection switches.

The capturing device 211 causes a display of a Personal Computer (PC) to display a still image or a video image based on image data (information). The GPU 212 is a semiconductor chip dedicated to processing a graphical image. The display controller 213 controls and manages a screen display to output an image output from the GPU 212 to the display 220 or the like. The contact sensor 214 detects contact with the display 220 by an electronic pen P or a user's hand H. The sensor controller 215 controls the contact sensor 214.

The contact sensor 214 senses a touch input to a specific coordinate on the display 220 using the infrared blocking system. The light-receiving elements emit a plurality of infrared rays parallel to a surface of the display 220. The light-receiving elements receive light passing in the direction that is the same as an optical path of the emitted infrared rays, which are reflected by the reflector frame. More specifically, the display 220 is provided with two light-receiving elements disposed on both upper side ends of the display 220, and a reflector frame surrounding the sides of the display 220. The contact sensor 214 outputs an identifier (ID) of the infrared ray that is blocked by an object after being emitted from the light receiving elements, to the sensor controller 215. Based on the ID of the infrared ray, the sensor controller 215 detects a specific coordinate that is touched by the object. The electronic pen controller 216 communicates with the electronic pen P to detect a touch by the tip or bottom of the electronic pen P to the display 220.

The short-range communication circuit 219 is a communication circuit that communicates in compliance with the NFC, the BLUETOOTH, and the like. The power switch 222 is a switch that turns on or off the power of the electronic whiteboard 200. In addition, for example, a group of switches may be provided for adjusting brightness, hue, etc., of the display 220 may be provided.

The electronic whiteboard 200 further includes a bus line 210. The bus line 210 is, for example, an address bus or a data bus, which electrically connects the components illustrated in FIG. 4, such as the CPU 201.

The contact sensor 214 is not limited to the infrared blocking system type, and may be a different type of detector, such as a capacitance touch panel that identifies a contact position by detecting a change in capacitance, a resistance film touch panel that identifies a contact position by detecting a change in voltage of two opposed resistance films, or an electromagnetic induction touch panel that identifies a contact position by detecting electromagnetic induction caused by contact of an object to a display. In addition to or in alternative to detecting contact by the tip or bottom of the electronic pen P, the electronic pen controller 216 may also detect contact by another part of the electronic pen P, such as a part held by a hand of the user.

Figure 5:
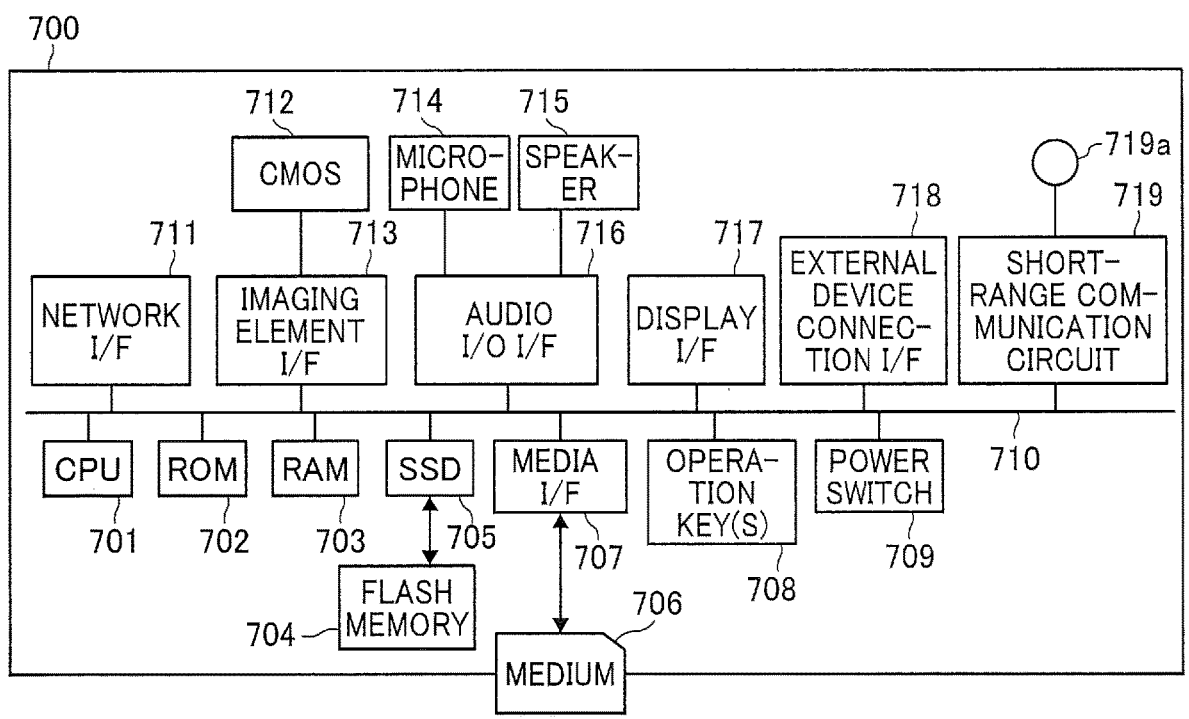
FIG. 5 is a block diagram illustrating a hardware configuration of a video conference terminal usable as an information apparatus according to one or more embodiments.

FIG. 5 is a block diagram illustrating a hardware configuration of a video conference terminal usable as an information apparatus according to the present embodiment. As illustrated in FIG. 5, the video conference terminal 700 (corresponding to the video conference terminal 40 in FIG. 1) includes a CPU 701, a ROM 702, a RAM 703, a flash memory 704, an SSD 705, a media I/F 707, an operation key 708, a power switch 709, a bus line 710, a network I/F 711, a camera 712, an imaging element I/F 713, a microphone 714, a speaker 715, an audio input/output (I/O) I/F 716, a display I/F 717, an external device connection I/F 718, a short-range communication circuit 719, and an antenna 719a for the short-range communication circuit 719.

The CPU 701 is a processor that performs overall control of the video conference terminal 700. The ROM 702 stores a program such as an IPL used for driving the CPU 701. The RAM 703 is used as a work area for the CPU 701. The flash memory 704 stores various data such as a communication control program, image data, and audio data. The SSD 705 controls reading or writing of various data from or to the flash memory 704 under control of the CPU 701. In alternative to the SSD, an HDD may be used. The media I/F 707 controls reading or writing (storing) of data from or to a recording medium 706 such as a flash memory. The operation key 708 is operated according to a user input indicating an instruction in selecting a destination of a communication from the video conference terminal 700, for example. The power switch 709 is a switch that turns on or off the power of the video conference terminal 700.

The network I/F 711 is an interface for performing data communication using the network 12. The camera 712, which is a Complementary Metal Oxide Semiconductor (CMOS) sensor is an example of a built-in imaging device capable of capturing a subject and obtaining image data under control of the CPU 701. In alternative to the CMOS sensor, an imaging element such as a Charge-Coupled Device (CCD) sensor may be used. The imaging element I/F 713 is a circuit that drives the CMOS sensor (camera) 712.

The microphone 714 is a built-in circuit that converts sound into an electric signal. The speaker 715 is a built-in circuit that generates audio such as music or voice by converting an electric signal into physical vibration. The audio I/O I/F 716 is a circuit for inputting or outputting an audio signal between the microphone 714 and the speaker 715 under control of the CPU 701. The display I/F 717 is a circuit for transmitting display data to an external display under control of the CPU 701. The external device connection I/F 718 is an interface for connecting various external devices. The short-range communication circuit 719 is a communication circuit that communicates in compliance with the NFC, the BLUETOOTH, and the like.

The bus line 710 is, for example, an address bus or a data bus, which electrically connects the components illustrated in FIG. 5, such as the CPU 701. The display 720 is an example of a display unit, such as a liquid crystal or organic electroluminescence (EL) display that displays an image of subject, an operation icon, or the like. The display 720 is connected to the display I/F 717 by a cable. The cable may be an analog red green blue (RGB) (Video Graphic Array (VGA)) signal cable, a component video cable, a HIGH-DEFINITION MULTIMEDIA INTERFACE (HDMI) signal cable, or a Digital Video Interactive (DVI) signal cable.

The external device connection I/F 718 is connectable with an external device such as an external camera, an external microphone, or an external speaker by using a USB cable or the like. When an external camera is connected, the external camera is driven in preference to the CMOS sensor 712, which is a built-in type, under control of the CPU 701. In a similar manner, when an external microphone is connected, or an external speaker is connected, the external microphone or the external speaker is driven in preference to the microphone 714, which is a built-in type, or the speaker 715, which is a built-in type, under control of the CPU 701.

The recording medium 706 is removable from the video conference terminal 700. The recording medium 706 is not limited to the flash memory 704. The recording medium 706 may be any non-volatile memory that reads or writes data under control of the CPU 701. In some embodiments, an Electrically Erasable and Programmable Read-Only Memory (EEPROM) is used.

With reference to FIG. 2 to FIG. 5, the hardware configuration of the user terminal device 14 and each hardware configuration of the multifunction peripheral 20, the electronic whiteboard 30, or the video conference terminal 40, which is usable as information apparatus, are described above. However, the hardware configurations of the user terminal device 14, the multifunction peripheral 20, the electronic whiteboard 30, and the video conference terminal 40 are not limited thereto. When other types of user terminal device and information apparatuses are used, the hardware configurations of these are substantially same as or similar to those illustrated in FIG. 2 to FIG. 5, and a hardware component may be added or removed as appropriate.

Figure 6:
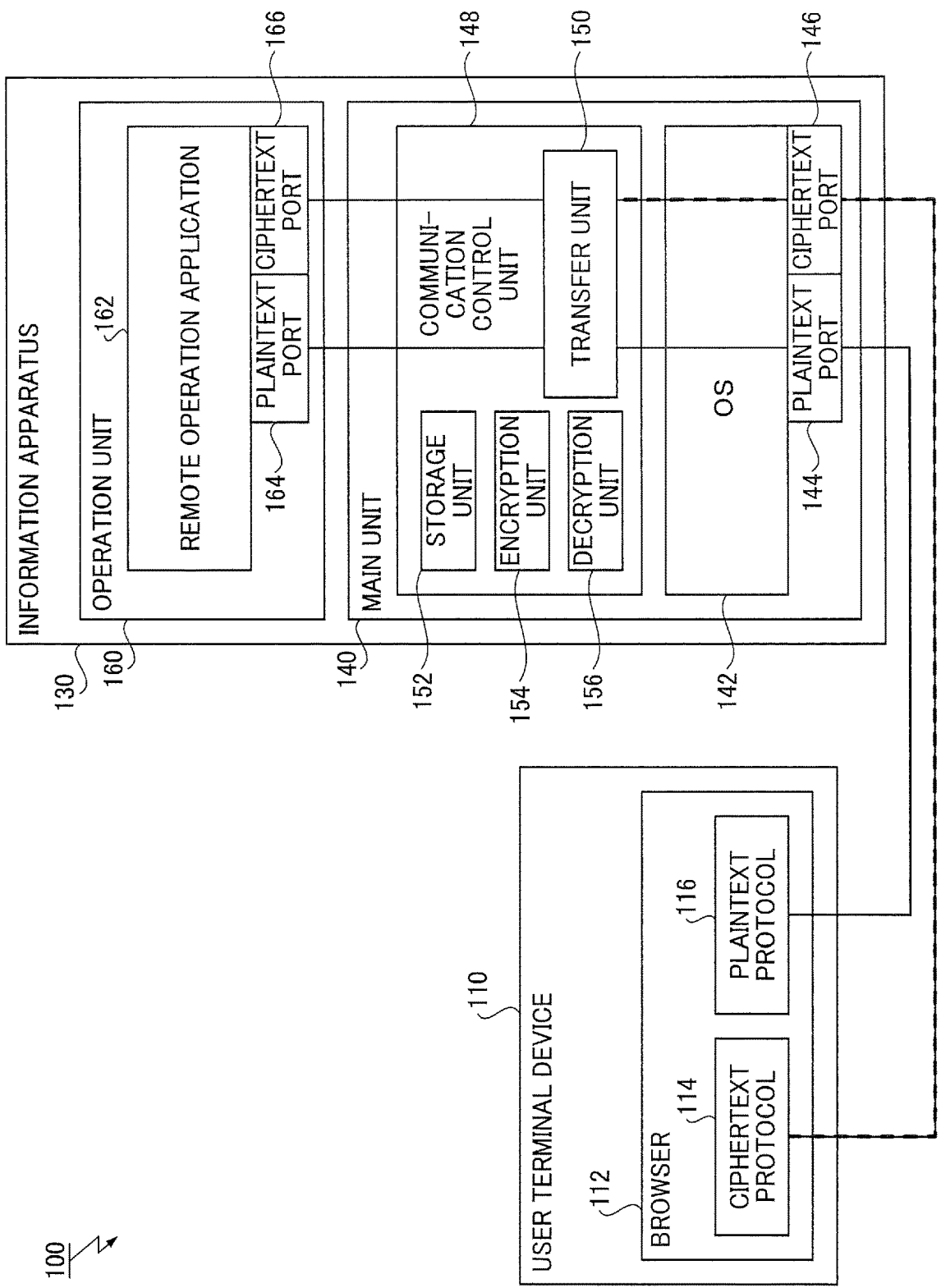
FIG. 6 is a block diagram illustrating a functional configuration of a user terminal device and a functional configuration of an information apparatus that implement the remote access function according to one or more embodiments.

A detailed description is now given of the remote access function according to the present embodiment, with reference to FIG. 6.

FIG. 6 is a block diagram illustrating a functional configuration of a user terminal device and a functional configuration of an information apparatus that implement the remote access function according to the present embodiment. In FIG. 6, a functional block 110 of the user terminal device 14 and a functional block 130 of the information apparatus are illustrated.

The functional configuration of the user terminal device 14 is described below. As illustrated in FIG. 6, the functional block 110 of the user terminal device 14 includes a browser 112 that is installed on the user terminal device 14. The present embodiment in which the browser 112 is used as an example is described. In some embodiments, a dedicated application may be used in alternative to the browser 112.

The browser 112 includes a ciphertext protocol 114 that performs encrypted communication such as Hypertext Transfer Protocol Secure (HTTPS) and a plaintext (cleartext) protocol 116 that performs plaintext (cleartext) communication such as Hypertext Transfer Protocol (HTTP).

The HTTPS refers to a protocol for performing HTTP communication over a secure connection provided by a Secure Sockets Layer (SSL)/Transport Layer Security (TLS)

protocol. In the HTTP, a message is transmitted or received as plaintext. Whereas, in the HTTPS, by using the SSL/TLS protocol, server authentication, encryption of communication content, and falsification (tampering) detection are performed. This prevents spoofing, man-in-the-middle attacks, eavesdropping, and other attacks.

In the HTTP communication, 80 or 8080 is used as a port number of well-known port of a server-side. In the HTTPS communication, 443 is used as a port number of well-known port of a server-side. The port is defined as an endpoint in data communication performed by an Operating System (OS). Whether the ciphertext protocol 114 or the plaintext protocol 116 is used is determined based on a Uniform Resource Locator (URL) scheme (e.g., a protocol name (http:// or https://)) specified in an address bar of the browser 112. Then, which port is used is determined based on a port number explicitly specified by the URL scheme and authority (information for specifying an information apparatus). For example, in a case of accessing an information apparatus by the plaintext communication, the information apparatus is accessible by inputting, for example, "http://A.B.C.D:8080/" into the address bar of the browser 112 in the plaintext communication. In a case of accessing the information apparatus by the encrypted communication, the information apparatus is accessible by inputting, for example, "https://A.B.C.D:443/" into the address bar of the browser 112 in the encrypted communication. In the above, "A.B.C.D" is an Internet Protocol (IP) address of the information apparatus, and each of "8080" and "443" is the port number for the information apparatus.

The description of the functional configuration of the information apparatus continues below. As illustrated in FIG. 6, the functional block 130 of the information apparatus includes a main unit 140 and an operation unit 160.

The main unit 140 includes an OS 142 and a communication control unit 148. The OS 142 is basic software that performs operation of the information apparatus. The communication control unit 148 is software for providing network-related services. The main unit 140 may be provided with a platform or an application for providing a service specific to the apparatus.

The information apparatus is assigned with an IP address. Although a fixed IP address is suitable for remote access, the IP address is not limited thereto, and an IP address dynamically assigned may be used as long as a name resolution process is performable. The OS 142 includes a plaintext port (first communication port) 144 and a ciphertext port (second communication port) 146 for receiving a request with respect to a remote operation application 162 from an external device. In the example case of the MFP 900, the plaintext port 144 and the ciphertext port 146 are mainly implemented by processing of the CPU 901 illustrated in FIG. 3 and the network I/F 950 illustrated in FIG. 3. In the example case of the electronic whiteboard 200, the plaintext port 144 and the ciphertext port 146 are mainly implemented by processing of the CPU 201 illustrated in FIG. 4 and the network I/F 205 illustrated in FIG. 4. In the example case of the video conference terminal 700, the plaintext port 144 and the ciphertext port 146 are mainly implemented by processing of the CPU 701 illustrated in FIG. 5 and the network I/F 711 illustrated in FIG. 5. The plaintext port 144 receives a plaintext communication request. The ciphertext port 146 receives a ciphertext communication request.

The operation unit 160 includes the remote operation application 162. In the example case of the MFP 900, the operation unit 160, or the remote operation application 162, is mainly implemented by processing of the CPU 901 illustrated in FIG. 3. In the example case of the electronic whiteboard 200, the operation unit 160, or the remote operation application 162, is mainly implemented by processing of the CPU 201 illustrated in FIG. 4. In the example case of the video conference terminal 700, the operation unit 160, or the remote operation application 162, is mainly implemented by processing of the CPU 701 illustrated in FIG. 5. The remote operation application 162 is an application for remotely operating an information apparatus and provides a processing function of processing a communication request received from a device that is a request source. The remote operation application 162 is configured according to a specific implementation of the information apparatus. For example, in the case of the multifunction peripheral 20, an operation screen is provided for operating multifunction peripheral 20 to perform various settings, copying, facsimile transmission, printing, or scanning, or to provide a maintenance service. The operation unit 160 is provided with a plaintext port 164 and a ciphertext port 166 for the remote operation application 162.

In the embodiment described herein, an operating system independent of one (another operating system) that operates on the main unit 140 operates on the operation unit 160. The remote operation application 162 is executed to operate on the operating system that is independent of the one on the main unit 140, in the operation unit 160. However, the present disclosure is not limited to such a configuration.

More specifically, the communication control unit 148 includes, as a proxy, a transfer unit 150 for transferring a communication request from the outside to the remote operation application 162 by switching ports. In the example case of the MFP 900, the transfer unit 150 is mainly implemented by processing of the CPU 901 illustrated in FIG. 3. In the example case of the electronic whiteboard 200, the transfer unit 150 is mainly implemented by processing of the CPU 201 illustrated in FIG. 4. In the example case of the video conference terminal 700, the transfer unit 150 is mainly implemented by processing of the CPU 701 illustrated in FIG. 5. In response to a plaintext communication request received via the plaintext port 144, the transfer unit 150 transfers the plaintext communication request as it is to the remote operation application 162 via the plaintext port 164 of the operation unit 160. In addition, in response to a ciphertext communication request received via the ciphertext port 146, the transfer unit 150 transfers a plaintext communication request that is obtained by decrypting the ciphertext communication request to the remote operation application 162 via the ciphertext port 166 of the operation unit 160. Here, the communication requests may include remote operation content.

When receiving a plaintext communication request and receiving a plaintext processing result corresponding to the communication request from the remote operation application 162, the transfer unit 150 transmits to a request source that is the user terminal device 14 a response that is the plaintext processing result. In addition, when receiving a ciphertext communication request and receiving a plaintext processing result corresponding to the communication request from the remote operation application 162, the transfer unit 150 transmits to a request source that is the user terminal device 14 a response that is a processing result that is obtained by encrypting the plaintext processing result. The plaintext processing result and the processing result obtained by encrypting the corresponding plaintext processing result are transmitted to the user terminal device 14, which is the request source, from the plaintext port 144 and the ciphertext port 146, respectively.

The communication control unit 148 further includes a storage unit 152, an encryption unit 154, and a decryption unit 156. In the example case of the MFP 900, the storage unit 152 is implemented by the MEM-P 902 illustrated in FIG. 3. In the example case of the electronic whiteboard 200, the storage unit 152 is implemented by the ROM 202, the RAM 203, or the SSD 204 illustrated in FIG. 4. In the example case of the video conference terminal 700, the storage unit 152 is implemented by the ROM 702, the RAM 703, or the SSD 705 illustrated in FIG. 5. The storage unit 152 stores a certificate. The certificate is a digital certificate defined by a standard such as X.509. X.509 is a standard of Public Key Infrastructure (PKI) of the International Telecommunication Union Telecommunication Standardization Sector (ITU-T) and defines a certification path verification algorithm and a standard format of a public key certificate. The encryption unit 154 and the decryption unit 156 may be provided as a library for decrypting ciphertext and encrypting plaintext. In the example case of the MFP 900, each of the encryption unit 154 and the decryption unit 156 is mainly implemented by processing of the CPU 901 illustrated in FIG. 3. In the example case of the electronic whiteboard 200, each of the encryption unit 154 and the decryption unit 156 is mainly implemented by processing of the CPU 201 illustrated in FIG. 4. In the example case of the video conference terminal 700, each of the encryption unit 154 and the decryption unit 156 is mainly implemented by processing of the CPU 701 illustrated in FIG. 5. When a ciphertext communication request is received, the decryption unit 156 decrypts the ciphertext communication request based on the certificate stored in the storage unit 152. When a plaintext processing result is received, the encryption unit 154 encrypts a plaintext processing result based on the certificate stored in the storage unit 152.

As described above, by using the certificate stored in the information apparatus by the remote operation, the encrypted communication with each user terminal device 14 is possible without preparing a plurality of certificates. The certificate has a function of displaying the certificate on a web browser when an Internet Protocol (IP) address assigned to an information apparatus is input in an address bar of the browser, and the certificate is commonly usable in the remote operation selected from the web browser.

These units of the information apparatus are functions that are implemented by or that are caused to function by operating any of the hardware elements, for example, illustrated in FIG. 3, FIG. 4, or FIG. 5 in cooperation with instructions of the CPU 901, CPU 201, or CPU 701, according to the corresponding program dedicated to the MFP 900, the electronic whiteboard 200, or the video conference terminal 700.

A detailed description is now given of a flow of transmission of a communication request. According to a URL specified by the browser of the user terminal device 14, whether a plaintext communication request is to be received by the plaintext port 144 of the main unit 140 of the information apparatus or a ciphertext communication request is to be received by the ciphertext port 146 of the main unit 140 of the information apparatus. In the information apparatus, in case that the plaintext is specified, the communication request is received by the plaintext port 144 and transferred to the plaintext port 164 of the remote operation application 162 in the operation unit 160 via the transfer unit 150 of the communication control unit 148. The same applies to the reverse flow.

In case that the ciphertext is specified, the communication request is received by the ciphertext port 146. Then, the communication control unit 148 uses the decryption unit 156 to decrypt the communication request based on the certificate stored in the storage unit 152 to obtain the plaintext and transfers the communication request, which is decrypted, to the remote operation application 162. The communication, which is originally the encrypted communication, is transmitted to the ciphertext port 166 of the remote operation application 162 as the plaintext obtained by the decryption performed in the main unit 140. In a case of the reverse flow, the communication control unit 148 encrypts, based on the certificate stored in the storage unit 152, a processing result obtained from the remote operation application 162 by using the encryption unit 154 and transfers a ciphertext processing result obtained by the encryption to the user terminal device 14, which is the request source, via the ciphertext port 146. In FIG. 6, a broken line indicates a part in relation to the encrypted communication.

In some embodiments, a communication session between the user terminal device 14 and the main unit 140 is established by a first communication protocol, and then bidirectional communication (two-way communication) is performed by a second communication protocol. In some embodiments, the first communication protocol and the second communication protocol are different from each other. In the other embodiments, the first communication protocol and the second communication protocol may be the same with each other. In both cases, the plaintext port 144 is used for a plaintext communication request and the ciphertext port 146 is used for a ciphertext communication request. In addition, in certain embodiments, the communication session is established with a request of "HTTP Upgrade Required (http upgrade req)," and the second communication protocol for bidirectional communication includes a WebSocket.

Further, in some embodiment, the bidirectional communication after the establishment of the communication session is terminated in response to a termination request (close request) for a series of processes, and the plaintext communication request or the ciphertext communication request is included in the series of processes up to the termination request. Since the communication from the remote operation application 162 is all in plaintext, the transfer unit 150 stores information on whether the communication request is in relation to the ciphertext or the plaintext, during a period from when the communication session is established to when the session terminates in response to the termination request, and processes a processing result corresponding to the communication request based on the stored information.

Figure 7:
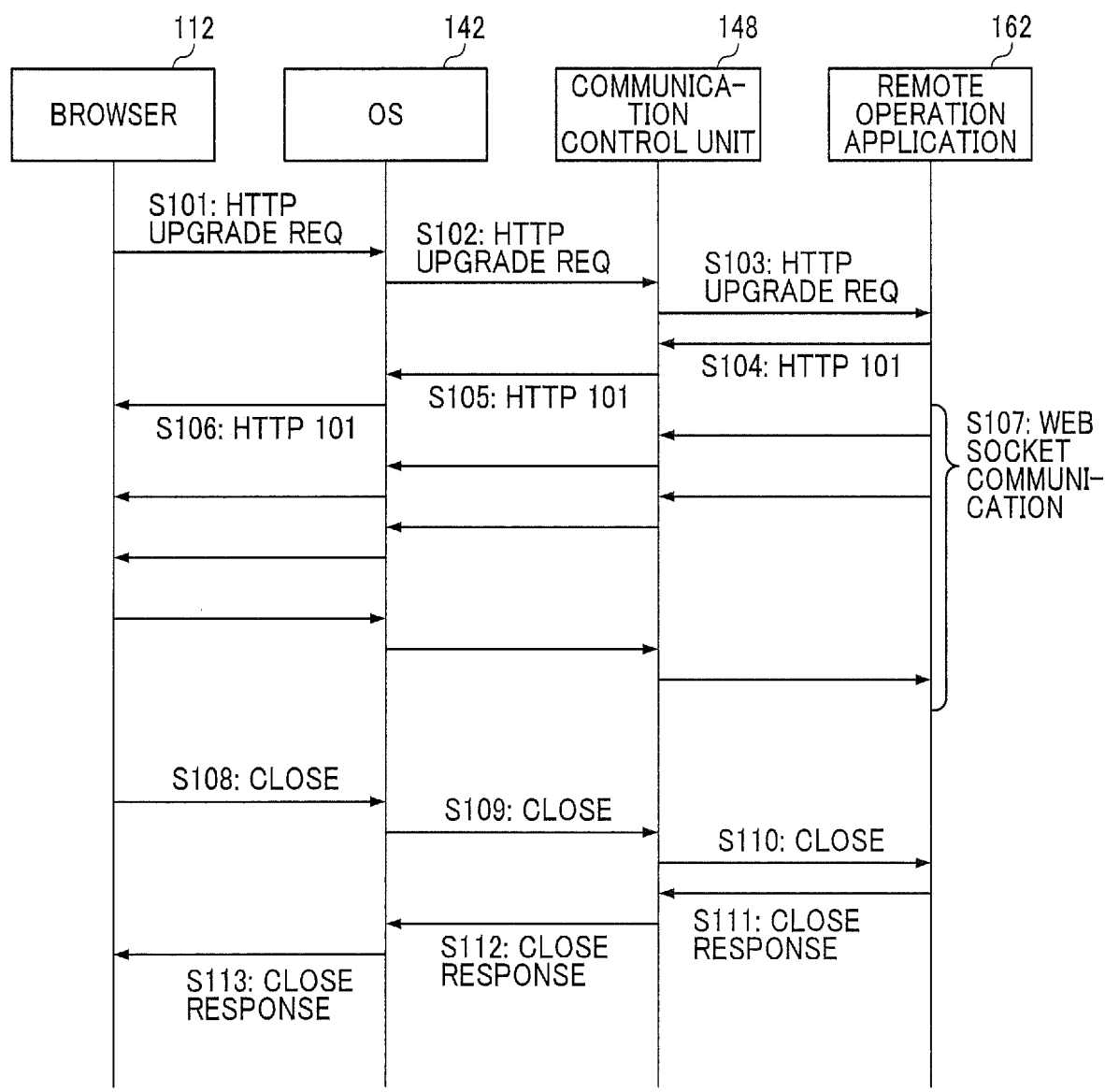
FIG. 7 is a sequence diagram illustrating a communication between an information apparatus and a user terminal device with plaintext or ciphertext according to one or more embodiments.

A description is now given of a communication flow between the information apparatus and the user terminal device, with reference to FIG. 7. FIG. 7 is a sequence diagram illustrating a communication between the information apparatus and the user terminal device with the plaintext or the ciphertext according to the present embodiment. The sequence diagram illustrated in FIG. 7 applies to both the plaintext and the ciphertext.

As illustrated in FIG. 7, in step S101, communication between the browser 112 and the remote operation application 162 starts in response to a request message, "http upgrade req", transmitted from the browser 112 to the information apparatus via a network (when the browser 112 transmits "http upgrade req" to the information apparatus via a network). In step S102, the OS 142 passes the request message, "http upgrade req", to the communication control unit 148. In step S103, the communication control unit 148 passes the request message, "http upgrade req", to the remote operation application 162.

In step S104, in response to the request message, "http upgrade req", the remote operation application 162 passes a response message, "http 101 (Switching Protocols)", to the communication control unit 148. In step S105, the communication control unit 148 passes the response message, "http 101", to the OS 142. In step S106, the OS 142 of the information apparatus responses with the response message, "http 101", to the browser 112 of the user terminal device 14. The response message, "http 101", is transmitted as a response to an upgrade request from a client and indicates that the server switches the protocol.

After step S106, as illustrated in step S107, bidirectional communication of WebSocket is performed. As described above, because the session is established with http first, the session is accessible from any web browser. After that, by performing the bidirectional communication using the WebSocket, the remote operation which is mainly image transferring from the browser 112 is performable smoothly in real time.

When terminating the remote operation, in step S108, the browser 112 transmits a close request message to the OS 142 of the information apparatus. In step S109, the OS 142 passes the close request message to the communication control unit 148. In step S110, the communication control unit 148 passes the close request message to the remote operation application 162.

In response to this, in step S111, the remote operation application 162 passes a close response message to the communication control unit 148. In step S112, the communication control unit 148 passes the close response message to the OS 142. In step S113, the OS 142 of the information apparatus transmits the close response message, to the browser 112 of the user terminal device 14. Thus, when the remote operation is completed, the established session is closed from the browser 112.

Figure 8:
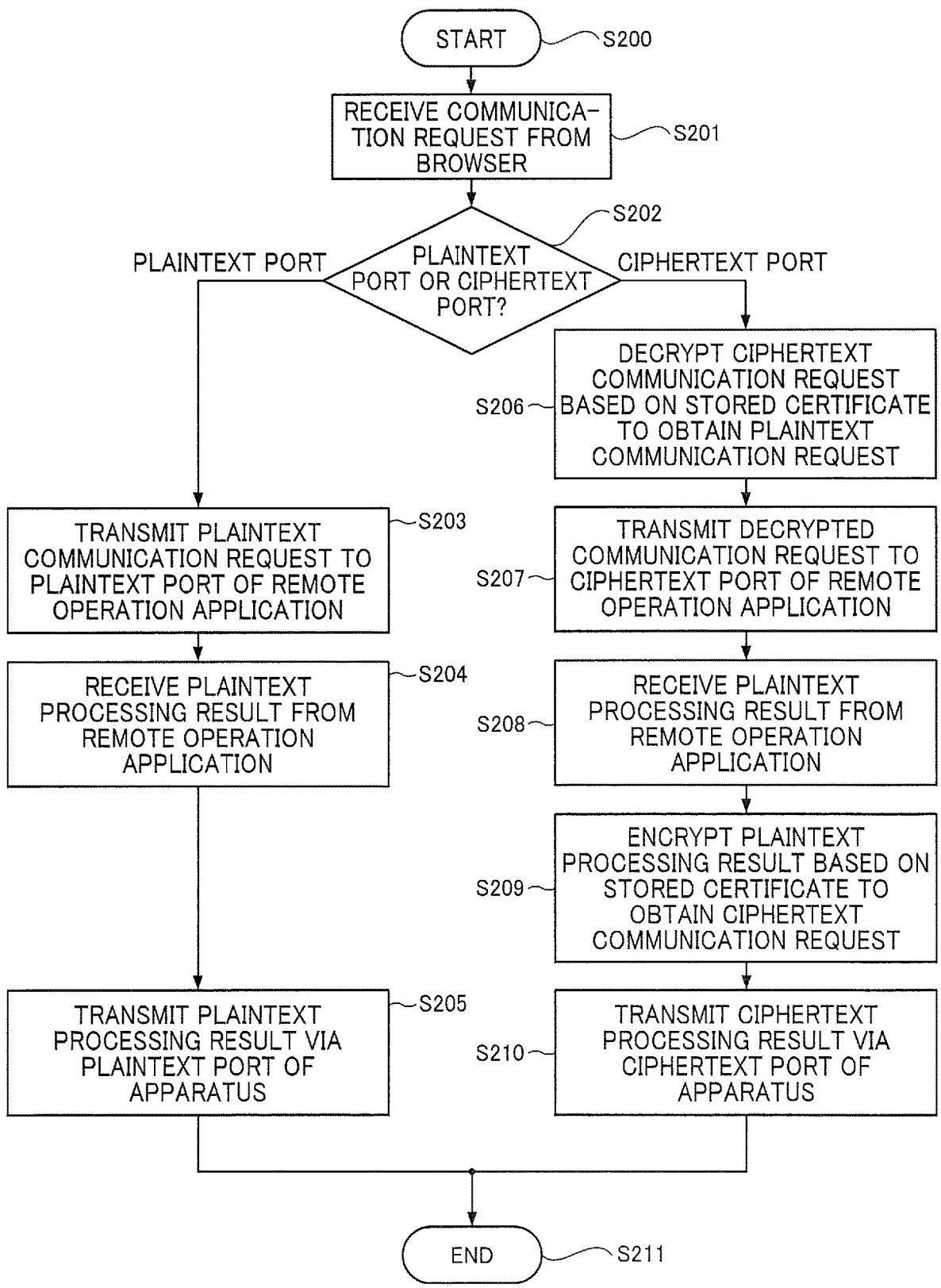
FIG. 8 is a flowchart illustrating a distribution process, in which a communication request from outside is transferred to an application by switching a port, performed by a transfer unit according to one or more embodiments.

A detailed description is now given of a process performed by the transfer unit 150 with reference to FIG. 8. FIG. 8 is a flowchart illustrating a distribution process performed by the transfer unit 150 according to the present embodiment, in which a communication request from the outside is transferred to an application by switching a port.

The process illustrated in FIG. 8 starts from step S200, and in step S201, the transfer unit 150 receives a communication request from the browser 112 of the user terminal device 14. The transfer unit 150 receives, from the user terminal device 14, which is a request source, a plaintext communication request via the plaintext port 144 or receives a ciphertext communication request via the ciphertext port 146. It is assumed that the received communication request related to the operation from the browser 112 is transmitted after the user logs in as an administrator of the device by using the browser 112 and a session is established. Regarding the establishment of the session, there is no limitation, but a first come basis is applied. Regarding the establishment of the session, in order to prevent that a plurality of users operates at the same time, at most one session is able to be established, that is, during a first session is being established, a second session with a next request is not able to be established.

In step S202, the process branches according to whether the communication request is received by the transfer unit 150 via the plaintext port 144 or via the ciphertext port 146.

When a determination result obtained in step S202 indicates that the communication request is received via the plaintext port 144 (PLAINTEXT PORT), the process proceeds to step S203. In step S203, the transfer unit 150 transmits the received plaintext communication request as it is to the plaintext port 164 of the remote operation application 162. In addition, a value indicating that the communication request is in the plaintext is stored in a predetermined storage area at a time of establishing the session, and the storage area stores the value until the session ends, in order to grasp that the communication request is in the plaintext. The value is not used when the communication request is transmitted from the browser 112. The value is used to determine whether the communication transmitted from the remote operation application 162 to the browser 112 is to be with the plaintext or ciphertext. In step S204, the transfer unit 150 receives the plaintext processing result from the remote operation application 162. In step S205, the transfer unit 150 transmits the plaintext processing result to the browser 112 via the plaintext port 144 of the information apparatus based on the stored value, and the process ends with step S211.

When a determination result obtained in step S202 indicates that the communication request is received via the ciphertext port 146 (CIPHERTEXT PORT), the process proceeds to step S206. In step S206, the transfer unit 150 decrypts the ciphertext communication request based on the stored certificate to obtain the plaintext communication request. In addition, a value indicating that the communication request is in the ciphertext is stored in a predetermined storage area at a time of establishing the session, and the storage area stores the value until the session ends, in order to grasp that the communication request is in the ciphertext.

In step S207, the transfer unit 150 transmits a decrypted communication request, which is a plaintext communication request, to the ciphertext port 166 of the remote operation application 162. In step S208, the transfer unit 150 receives a plaintext processing result from the remote operation application 162. In step S209, the transfer unit 150 encrypts the received plaintext processing result based on the stored value and based on the stored certificate to obtain a ciphertext communication request. In step S210, the transfer unit 150 transmits the ciphertext processing result to the browser 112 via the ciphertext port 146 of the information apparatus, and the process ends with step S211.

In the above-described configuration, in the user terminal device 14, which performs remote access from a remote location, it is possible to selectively use a protocol according to from where the user terminal device 14 accesses, as follows. For example, when being accessed within the company, information apparatus is accessible by using the plaintext communication (HTTP) with priority given to communication speed. From outside the company, the information apparatus is accessible by using the encrypted communication (HTTPS) with priority given to security. The selection may be made by specifying a URL corresponding to one of the plaintext port and the ciphertext port, which are used in remotely accessing the information apparatus from the user terminal device 14.

Figure 9:
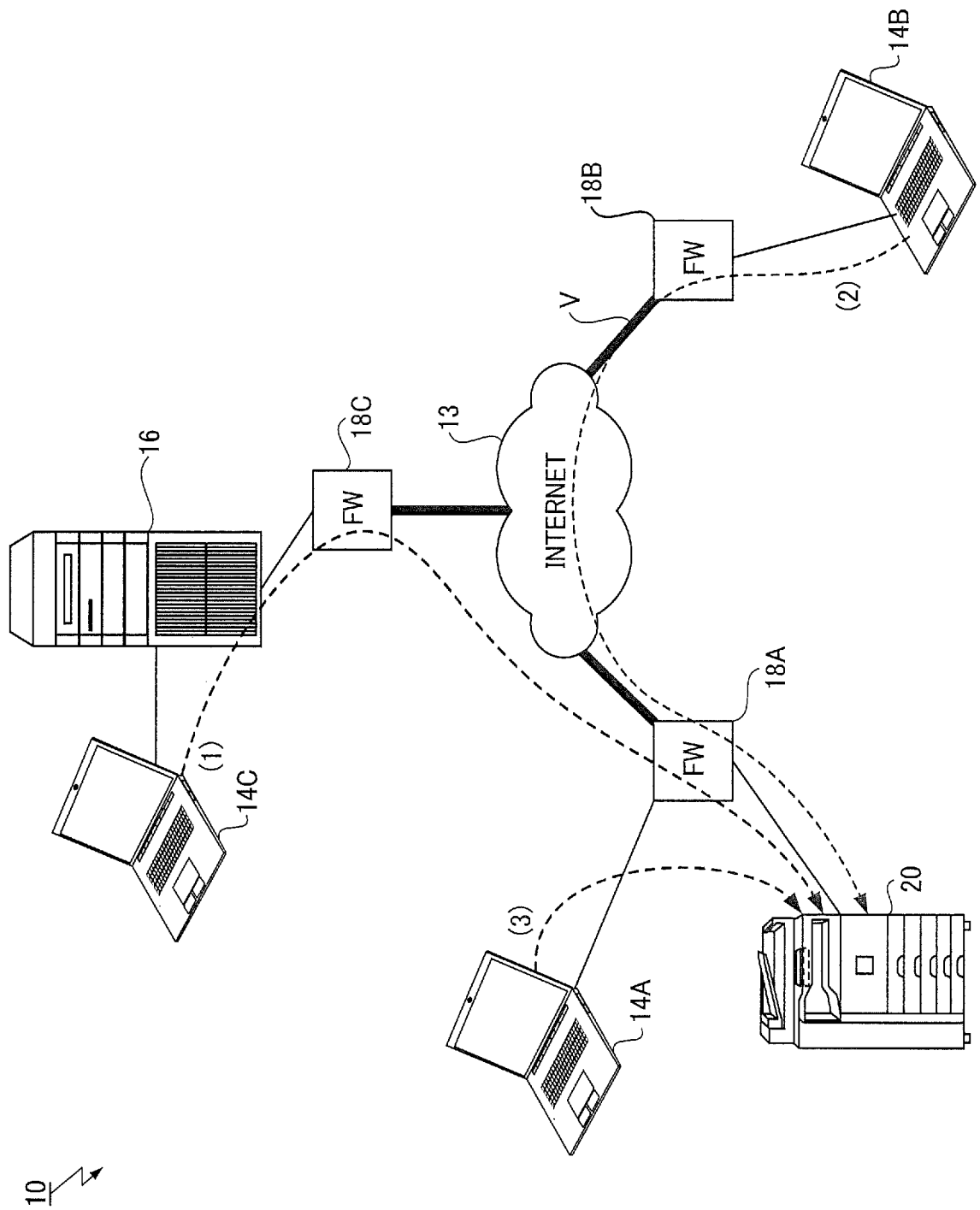
FIG. 9 is a schematic diagram illustrating example use cases of remotely accessing an information apparatus according to one or more embodiments.

FIG. 9 is a schematic diagram illustrating example use cases of remotely accessing an information apparatus according to the present embodiment. A first use case (1): Accessing the multifunction peripheral 20, via a cloud server 16 used for remote firmware update, from an information equipment supplier (a user terminal device 14C) through connection V via firewalls 18A and 18c that allows 443/Transmission Control Protocol (TCP), through the Internet 13, using the encrypted communication (HTTPS communication). A second use case (2): Accessing the multifunction peripheral 20 from an Information Technology (IT) management department (a user terminal device 14B) through the connection V via firewalls 18A and 18B that allows 443/TCP, through the Internet 13, using the encrypted communication (HTTPS communication), in a case that an inexperienced department, which is a user department, requires operation guidance by remote access in a production introduction period, for example. In this case, the operation contents can be shared between the IT management department and the user department. A third use case (3): Accessing the multifunction peripheral 20 from a location in the same site but have a certain distance, using the plaintext communication (HTTP communication, 8080/TCP) without going through a firewall.

As described above, option to specify the plaintext communication or the encrypted communication is given to a user. For example, the option is given by a plaintext communication button and an encrypted communication button or a hyperlink. Alternatively, a URL may be directly specified. For example, in specifying the plaintext communication, "http://(IP address of information apparatus):(plaintext port number of information apparatus)" is specified, and in specifying the encrypted communication, "https://(IP address of information apparatus):(ciphertext port number of information apparatus)" is specified. In the case of the plaintext communication, the remote operation is performable with priority given to the communication speed. In the case of the encrypted communication, the remote operation is performable with priority given to the security, and the remote access is performable from home that is outside of the same network.

Here, even in a case that a user erroneously specifies the plaintext communication when accessing from a place other than the same network, a Domain Name Server (DNS) error is detected by a firewall, in general, and the remote access is failed to be performed. Accordingly, it is possible to make the user notice that he or she has selected the plaintext communication in spite of the remote access from outside of the company, and to urge the user to perform the remote access again by the encrypted communication, thereby ensuring security.

As described above, according to the above-described embodiments, an information apparatus, a method executed by the information apparatus, and a program for implementing the information apparatus each capable of selecting which of security or communication speed has priority according to a use case are provided.

In a conventional technology, providing a suitable environment according to a use situation, for example, accessing within a company or accessing from outside the company, is difficult.

In view of the above, an object of one or more of the present disclosure is to provide an information apparatus capable of providing a suitable environment according to a use situation.

Each configuration of the above-described embodiments is capable of providing an environment suitable for a use application.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions. Further, by storing the program in the recording medium, the program is installable on a plurality of computers, and the remote access function according to the present embodiment is available, accordingly.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

The invention claimed is:

1. An information apparatus, comprising:
a memory, and
circuitry configured to
receive a communication request transmitted from a request source device, the communication request being one of a plaintext communication request and a ciphertext communication request,
wherein, in response to receiving the plaintext communication request, the circuitry transfers the plaintext communication request for processing, and
in response to receiving the ciphertext communication request, the circuitry decrypts the ciphertext communication request to obtain another communication request and transfers the another communication request for processing,
wherein the circuitry is configured to store a value indicating whether the received communication request is the plaintext communication request or the ciphertext communication request in the memory, and
wherein, upon receiving a plaintext processing result, the circuitry is configured to determine whether to encrypt the plaintext processing result based on the value stored in the memory.

2. The information apparatus of claim 1, wherein a first network to which the request source device belongs being different from a second network to which the information apparatus belongs, and the request source device accesses the information apparatus via a firewall.

3. The information apparatus of claim 1, further comprising
a memory that stores a certificate, wherein the circuitry further
decrypts the ciphertext communication request based on the certificate; and
encrypts the plaintext processing result based on the certificate.

4. The information apparatus of claim 1,
wherein the circuitry
establishes a communication session with the request source device using a first communication protocol, and
performs bidirectional communication with the request source device using a second communication protocol after establishing the communication session, the second communication protocol being different from the first communication protocol.

5. The information apparatus of claim 4,
wherein the circuitry uses, in both of the first communication protocol and the second communication protocol, a first communication port to receive the plaintext communication request and a second communication port to receive the ciphertext communication request.

6. The information apparatus of claim 4,
wherein the communication session is established in response to a request that is HTTP Upgrade Required (http upgrade req), and the second communication protocol includes WebSocket.

7. The information apparatus of claim 4,
wherein the bidirectional communication performed after establishing the communication session is terminated in response to a termination request for terminating a series of processing, and
wherein the communication request, which is the one of the plaintext communication request and the ciphertext communication request, is included in the series of processing up to the termination request.

8. The information apparatus of claim 1,
wherein the circuitry executes a remote operation application for the information apparatus, and the communication request includes of, remote operation content.

9. The information apparatus of claim 8,
wherein the remote operation application is executed on an operating system that is independent of another operating system operating fora main unit on the information apparatus.

10. The information apparatus of claim 1,
wherein the request source device includes a browser with which a Uniform Resource Locator (URL) specifying the one of the plaintext communication request and the ciphertext communication request is specified.

11. A method of processing a communication request executed by an information apparatus including a memory and circuitry, the method comprising:
receiving, by the circuitry, a communication request transmitted from a request source device, the communication request being one of a plaintext communication request or a ciphertext communication request;
in response to receiving, by the circuitry, the plaintext communication request, transferring, by the circuitry, the plaintext communication request for processing;
in response to receiving, by the circuitry, the ciphertext communication request, decrypting by the circuitry, the ciphertext communication request to obtain another communication request and transferring, by the circuitry, the another communication request for processing;
storing, by the circuitry, a value indicating whether the received communication request is the plaintext communication request or the ciphertext communication request in the memory, and
upon receiving a plaintext processing result, determining, by the circuitry, whether to encrypt the plaintext processing result based on the value stored in the memory.

12. A non-transitory recording medium storing a plurality of instructions which, when executed by an information apparatus including one or more processors and a memory, causes the processors to perform a method, the method comprising:
receiving a communication request transmitted from a request source device, the communication request being one of a plaintext communication request or a ciphertext communication request;
in response to receiving the plaintext communication request, transferring the plaintext communication request for processing;
in response to receiving the ciphertext communication request, decrypting the ciphertext communication request to obtain another communication request and transferring the another communication request for processing;
storing a value indicating whether the received communication request is the plaintext communication request or the ciphertext communication request in the memory, and
upon receiving a plaintext processing result, determining whether to encrypt the plaintext processing result based on the value stored in the memory.

* * * * *